United States Patent

[11] 3,629,688

[72] Inventor: Irving E. Fink
925 Park Road, El Paso, Tex. 79902
[21] Appl. No.: 53,471
[22] Filed: July 9, 1970
[45] Patented: Dec. 21, 1971

[54] INVERTERS
9 Claims, 5 Drawing Figs.

[52] U.S. Cl. ............................................. 321/50
[51] Int. Cl. ......................................... H02m 7/60
[50] Field of Search ............................. 321/49, 50

[56] References Cited
UNITED STATES PATENTS

| | | | |
|---|---|---|---|
| 1,197,978 | 9/1916 | Warner .................... | 321/49 |
| 501,558 | 7/1893 | Cabot ..................... | 321/50 X |
| 3,350,583 | 10/1967 | Schiavone ............... | 310/8.3 |
| 271,169 | 1/1883 | Waterhouse .............. | 321/50 X |
| 3,205,427 | 9/1965 | Maier ..................... | 321/50 |
| 3,463,942 | 8/1969 | Mellon .................... | 310/8.7 X |

FOREIGN PATENTS

| 207,434 | 4/1957 | Australia .................. | 321/5 |

Primary Examiner—William M. Shoop, Jr.
Attorney—Alter, Weiss & Whitesel

ABSTRACT: A unique device for changing direct current to alternating current. The "heart" of the device is a commutatorlike switch which provides the alternating current by continuously switching the direct current. The switch can also "generate" power using a piezo-electrical effect.

PATENTED DEC 21 1971 3,629,688
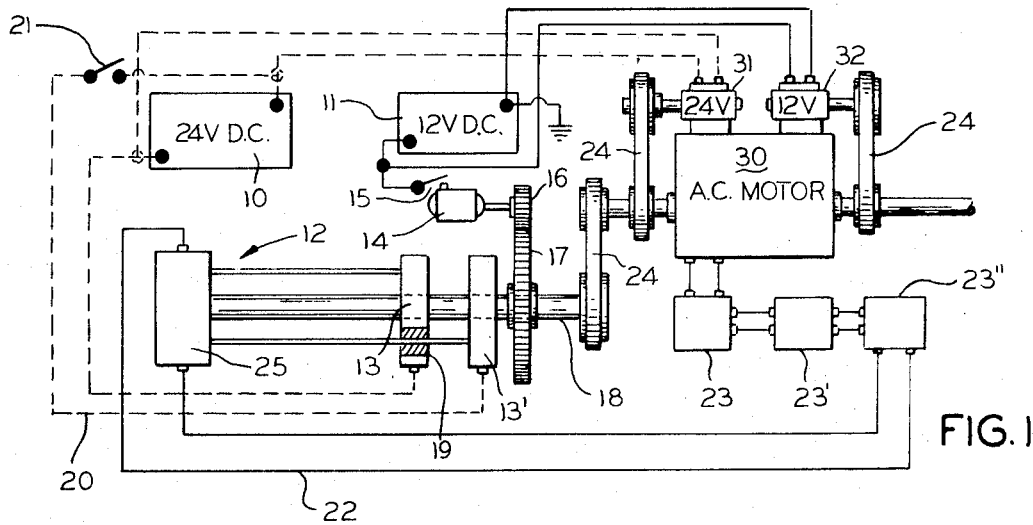
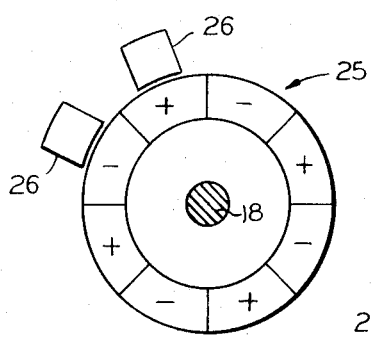
FIG.3
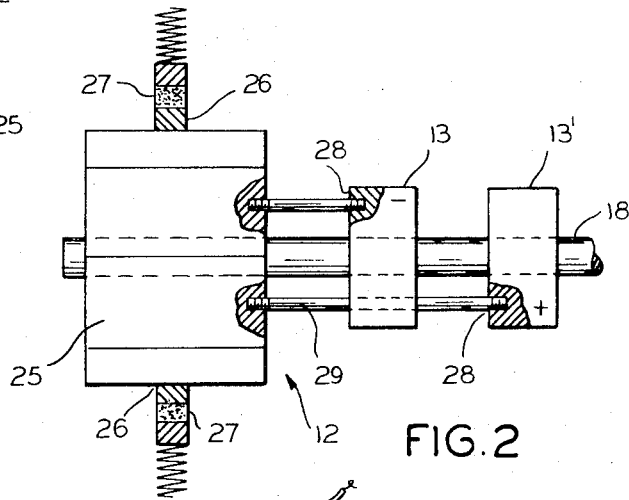
FIG.2
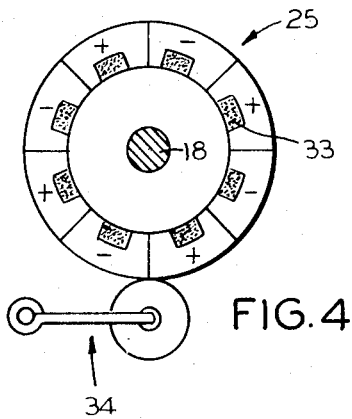
FIG.4
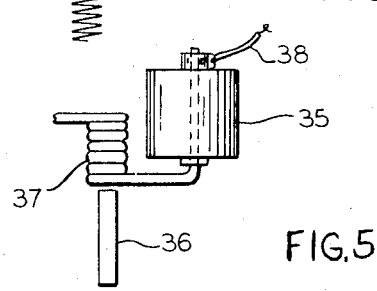
FIG.5
INVENTOR
IRVING E. FINK
BY
Alter, Weiss and Whitesel
ATTORNEYS

INVERTERS

This invention relates to inverters for changing direct current to alternating current, and more particularly to commutatorlike switching means for accomplishing the change from direct current to alternating current. The prime object of my invention is the provision for providing alternating current from the direct current of sources such as chemical batteries.

Another object of my invention is to employ a DC battery-powered starter to start the turning sequence of a commutatorlike switching system.

Other and further objects of my invention will become more apparent as the description proceeds, when taken in conjunction with the drawings; in which:

FIG. 1 is a schematic layout of the entire commutatorlike or segmented switching assembly as described;

FIG. 2 is a schematic layout incorporating piezo crystals in laminated brushes;

FIG. 3 is an end view of the segmented switching assembly shown in FIG. 2;

FIG. 4 is a schematic view of the commutator, having the commutator bars mounted onto piezo crystals, and FIG. 5 shows a detailed arrangement of the parts constituting the roller brush assembly.

The device described and claimed herein permits production of alternating-current voltage from a low voltage direct current source, such as a battery. By employing piezo electric crystals, the device will also generate voltages of predetermined amplitude and frequency.

Similar characters of reference indicated corresponding parts and features throughout the several views, and referring now to the same, in FIG. 1, the character 10 shows a 24 v. DC battery, and the character 11 shows a 12 v. DC battery. A segmented switching device is shown at 12. The device 12 is equipped with collector rings 13 and 13'.

The device 12 is shown driven by the direct current motor 14, actuated by the switch 15, which motor 14 is equipped with a pinion 16 engaging the gear 17 mounted onto the shaft 18 forming a part of the segmented switching device assembly 12.

The collectorlike rings 13 and 13' mounted onto the shaft 18 of the device 12 are equipped with insulation 19 to enable connecting the AC from ring 13' through ring 13. The rings are connected to the battery 10 by the DC current wires (dashed) 20 shown equipped with a switch 21. The AC current wires in the circuit, shown as 22, connect the output of the segmented switching device assembly 12 with the slipped transformers 23, 23' and 23''. The drives are shown as V-belts 24, however, any other drive may be employed.

The segmented switching device assembly 12 includes a commutatorlike segment section 25. A pair of brushes 26 are arranged juxtaposed to oppositely polarized segments as shown in FIG. 3. For convenience, they are shown separated by 180° in FIGS. 1 and 2. FIG. 2 shows an embodiment of brushes including a piezoelectrical crystal section 27. The segments of section 25 are in this embodiment arranged to apply a pressure to the piezoelectric elements of the brushes to thereby generate an electric voltage. The rings 13, 13' are electrically coupled to alternating segments by wires, such as wires 28, 29. It should be understood that section 25 could be a disc and is not limited to a drum.

The sequence begins by activating the starter switch 15. Current from the 12-volt battery or starter battery cranks the starter; this in turn rotates the device 12, and consequently the AC motor 30 and the two DC generators 31, 32. The DC circuit when turned on, supplies DC current to the segments of device 25 through rings 13, 13' positive to one, negative to the other. The segmented sections are connected alternately to the positive and negative collector rings. The rotation of assembly 12 thus produces alternating current steps on he brushes 26 and the wires 22 connecting assembly 12 to the lowest voltage transformer 23''. Each transformer in he series increases the voltage.

In FIG. 2, I show the alternator with the commutator 25 equipped with laminated brushes 26 equipped with piezo crystals at 27. The rings 13 and 13' are provided with sockets for the wires 28, 29.

In FIGS. 3, I show an end view of the commutator 25 with the positive and negative bars in position, while in FIG. 4, I show a similar commutator 25 with the bars mounted onto piezo crystals shown as 33 and a roller brush to compress the piezo crystals, which brush is generally shown as 34.

In FIG. 5, I show details of the brush assembly 34, consisting of a roller 35, a bushing insulator 36 and a coil spring 37, and also the wire 38 leading therefrom. Obviously, the piezo crystals are encapsulated in plastic, except for necessary wiring (not shown) and when squeezed the crystals generate full voltage.

From the above description, it will become manifest that the commutator which utilizes alternate charging of the commutator bars, so that they are alternately positive and negative, will produce a current from a DC power source by the rotation of the commutator against stationary brushes.

Although I have shown and described a specific arrangement, I am fully cognizant of the fact that many changes may be incorporated without affecting the operativeness, and I reserve the rights to make such changes without departing from the spirit of my invention or the scope of the appended claims.

Having thus described my invention, what I claim and desire to secure by Letters Patent in the United States, is:

1. An inverter for changing direct voltage to alternating-current voltage,
   said inverter comprising: a commutator switching assembly having a segmented member,
   said assembly including ring means for receiving direct current voltage from a direct current power supply,
   means for connecting said ring means to said segmented member to cause alternate ones of said segments to be positively and negatively polarized,
   means for causing said commutator switching assembly including said segmented member to rotate,
   at least one set of two brushes,
   means for holding said two brushes stationary and so that they are each contiguous to oppositely polarized ones of said segments as said segmented member rotates,
   means for connecting said set of brushes to provide an alternating current circuit to a load as said segmented member rotates, and
   wherein a portion of said output of said inverter is coupled to AC motor means,
   DC generator means driven by said AC motor means,
   said DC generator means coupled to said battery means to recharge said battery means.

2. The inverter of claim 1 wherein said commutator switching assembly comprises shaft means,
   means for causing said shaft means to rotate,
   said ring means comprising a first ring and a second ring,
   said first ring being permanently connected to the positive terminal of said power supply,
   said second ring permanently connected to the negative terminal of said power supply,
   each of said rings permanently mounted on said shaft to rotate when said shaft rotates, and
   said segmented member mounted on said shaft so that the segmented member also rotates as said shaft rotates.

3. The inverter of claim 2 wherein each segment of said segmented member is connected to alternate ones of said rings.

4. The inverter of claim 3 wherein said means for connecting each segment to said rings further comprises first conducting bars connecting said alternate ones of said segments to said first ring, and second conducting bars being longer than first conducting bars connecting the other segments to said second ring, and
   insulated portions being provided in said first ring for enabling said second conducting bars to extend there through.

5. The inverter of claim 4 wherein said means for rotating said shaft comprises DC motor means, said power supply means comprising battery means, switch means for coupling said DC motor means to said battery means, and gear means for coupling said shaft to said DC motor means.

6. The inverter of claim 1 wherein said AC motor is coupled to the output of said inverter means through transformer means.

7. The inverter of claim 6 wherein said brush means include piezoelectric crystal means, said commutator means designed to exert pressure against said brush means thereby generating a voltage that is independent of the power supply voltage, 8. The inverter of claim 1 wherein said least certain of said segments comprise piezoelectric means, means for coupling said piezoelectric means in said segments to provide output energy, and brush means foe exerting pressure on said piezoelectric means on said commutator segments to thereby generate piezoelectric output voltage on said switched output.

9. The inverter of claim 1 wherein said segmented member comprises a segmented disc.

* * * * *